United States Patent

Goshima et al.

[15] 3,704,400

[45] Nov. 28, 1972

[54] APPARATUS FOR CONTROLLING THE TENSION OF A MAGNETIC TAPE

[72] Inventors: Takeshi Goshima; Yutaka Kohtani, both of Tokyo, Japan

[73] Assignee: Canon Kabushiki Kaisha, Tokyo, Japan

[22] Filed: Oct. 23, 1970

[21] Appl. No.: 83,349

[30] Foreign Application Priority Data

Oct. 31, 1969 Japan ......................44/87479

[52] U.S. Cl. ..............................................318/6

[51] Int. Cl. .............................................H02r 7/28

[58] Field of Search..............................318/6, 7, 313

[56] References Cited

UNITED STATES PATENTS

| | | | |
|---|---|---|---|
| 2,943,809 | 7/1960 | Garrett | 318/7 X |
| 3,510,742 | 5/1970 | Pooley | 318/313 |
| 3,117,262 | 1/1964 | Mullin | 318/7 |
| 3,239,741 | 3/1966 | Rank | 318/313 |

*Primary Examiner*—Gene Z. Rubinson
*Assistant Examiner*—W. E. Duncanson, Jr.
*Attorney*—Ward, McElhannon, Brooks & Fitzpatrick

[57] ABSTRACT

In order to transport a strip such as magnetic tape with a constant tension, the reel driving motor is driven by current flowing in proportion to the time required for one revolution of the motor or in inverse proportion to the number of revolutions of the motor. So that the transporting strip such as magnetic tape is maintained at a constant velocity and with a constant tension, and thus any variations in the level and frequency may be eliminated completely.

7 Claims, 16 Drawing Figures

APPARATUS FOR CONTROLLING THE TENSION OF A MAGNETIC TAPE

BACKGROUND OF THE INVENTION

1. Field of the Invention

This invention relates to a tension control device, and more particularly to a device for electrically controlling the tension of a magnetic tape or other member in strip form as it is running.

2. Description of the Prior Art

In a strip feeding device including reel or spool means having a strip wound thereon such as magnetic tape, movie film, spinning yarn or the like, it is often necessary that the strip be transported always with a constant tension. In case of magnetic tape used with a tape recorder, for example, it has been widely recognized that it is desirable always to maintain the tension imparted to the tape at a constant value as the tape is moving to effect high-fidelity recording-reproduction.

According to the prior art, a motor for driving the reel is rotated with a constant torque and this has caused the tension of the tape to be varied as the diameter of the roll of tape on the reel is varied with the supply of the tape. This has in turn resulted in a variable contact stress between the tape and magnetic head and accordingly has resulted in a level variation as well as a slightly variable velocity of movement of the tape, which may lead to a variation in the reproducing frequency. This means a serious disadvantage in achieving a high-fidelity recording-reproducing effect.

SUMMARY OF THE INVENTION

It is an object of the present invention to provide a tension control device for enabling a strip such as magnetic tape or the like to be transported always at a constant velocity and with a constant tension.

It is another object of the present invention to provide a tension control device for controlling the tension of a strip at a constant level by the use of electrical means.

It is still another object of the present invention to provide a tension control device which detects the velocity of rotation of reel means having a strip wound thereon and converts the detection into an electrical value thereby to vary the current driving the reel means so as to enable the strip to be transported with a constant tension.

Other objects and features of the present invention will become apparent from the following detailed description of embodiments taken in conjunction with the accompanying drawings.

DESCRIPTION OF THE PREFERRED EMBODIMENTS

The tension imparted to a moving strip or tape depends on the torque of the motor driving the reel and on the diameter of the roll of strip or tape wound on the reel. If the velocity of movement of the strip or tape is a predetermined constant value, the varying diameter of the roll of strip or tape on the reel may be detected by detecting the velocity of rotation of the reel and the torque of the motor may be varied by varying the current supplied to the motor.

By utilizing such relationship, the present invention supplies a reel driving motor with a current proportional to the time required for 1 revolution of that motor, namely, a current inversely proportional to the number of revolutions of the reel driving motor, thereby to generate a torque in proportion to the diameter of the roll of strip or tape on the driven reel so as to maintain a constant tension imparted to the moving strip or tape.

It is now assumed that N is the number of revolution of the reel driving motor (r.p.s.), $v$ is the velocity of the tape (m/sec.), F is the tension of the tape (kg), $\tau\alpha$ is the torque constant of the motor (kg-m/A), Ris the diameter of the roll of strip or tape on the reel ($m$), and I is the current passing through the motor (A). Then, the strip or tape is supplied by the reel (or taken up by another reel) at a rate of 2 $\pi$RN m/sec., which is in accord with the velocity $v$ of the strip or tape, as expressed below.

$$2\pi RN = v, R = v/2\pi RN \quad (1)$$

On the other hand, the torque $\tau$ of the motor is expressed as:

$$\tau = \alpha I (kg\text{-}m),$$

from which the tension F of the strip or tape is given:

$$F = \alpha F/R (Kg)$$

By substituting equation ($l$) for the above, $F$ is expressed as:

$$F = 2\pi\alpha IN/v \ (kg)$$

Since $\alpha$ is a constant and $v$ is a preset value, the tension $F$ can be maintained at a constant value by passing a current $I$ inversely proportional to the number of revolutions $N$ when $R$ is varied with time. Thus, the current $I$ is expressed as $$I = v^F/2\pi\alpha \cdot 1/N,$$

where $v$, $F$ and $\alpha$ are all constant. Hence, if $$v^F/2\pi\alpha = K$$

(constant), there is obtained a relation that $I = K\ 1/N$. This proves that the tension imparted to the strip or tape can be maintained constant by supplying the motor with a current inversely proportional to the number of revolutions N.

The present invention is based on the above-described principle and it will now be described with some specific embodiments thereof.

Figure 1:
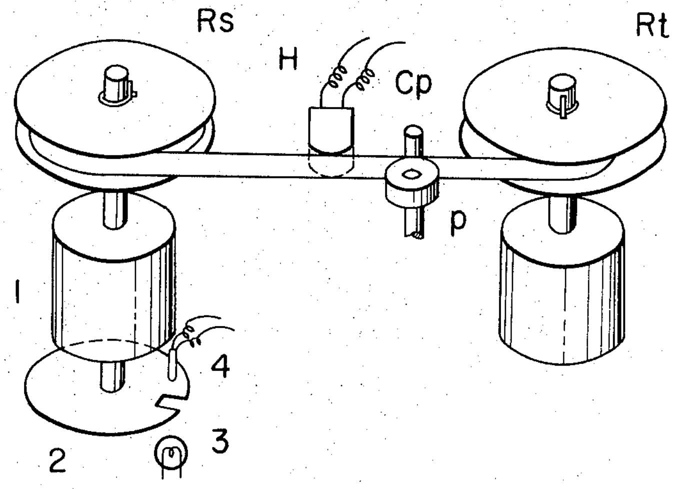
FIG. 1 is a schematic perspective view illustrating the construction of a magnetic tape device to which the present invention is applicable.
Figure 2:
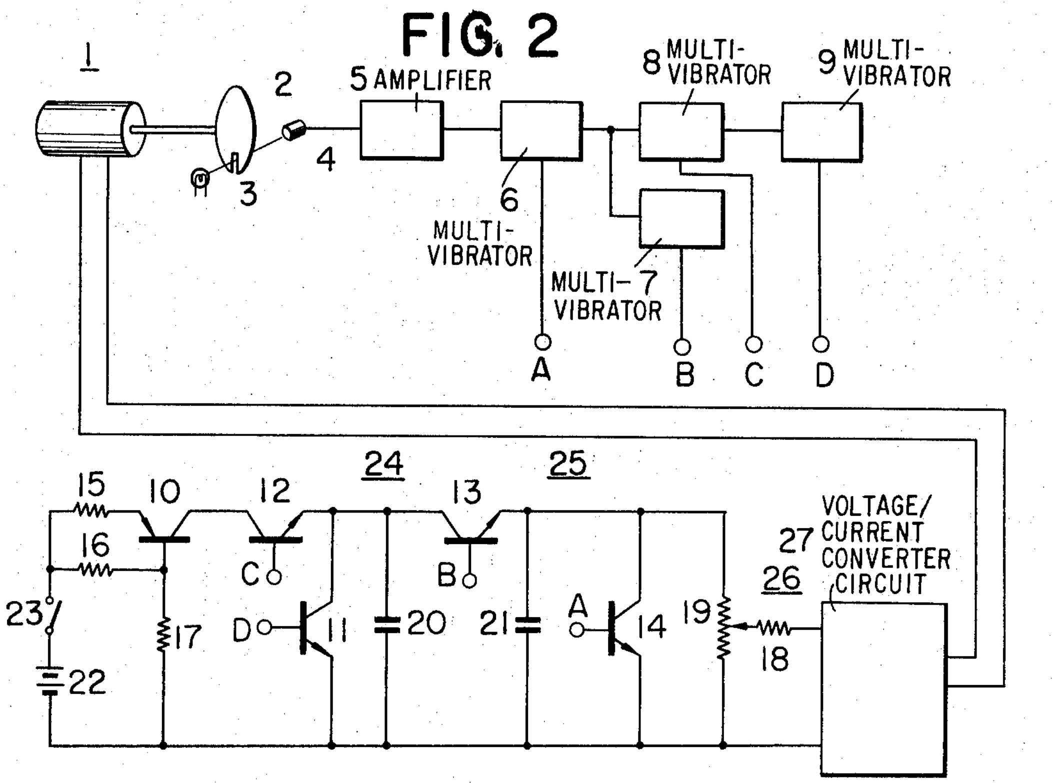
FIG. 2 is a block diagram of the tension control device according to an embodiment of the present invention.

Referring to FIGS. 1 and 2, the invention is shown as applied to a magnetic tape device. As shown in FIG. 1, a reel driving motor 1 has a drive shaft, and a light shielding disc 2 having a radial slit formed in the circumference thereof is secured to the drive shaft of the motor 1 at the lower end thereof. Below the disc 2 there is disposed a light source 3. A photo-responsive element 4 like a photo-transistor detecting light and producing an electrical signal is also provided. A supply reel Rs is mounted for rotation on the drive shaft at the upper end thereof, and a magnetic tape T is wound on the supply reel Rs. The tape T is shown to be supplied from the supply reel Rs to a take-up reel Rt at a constant velocity while engaging a magnetic head H and passing between a capstan Cp and a pinch roller P, the capstan Cp being rotated at a constant velocity by a mechanism not shown.

As shown in FIG. 2, the photo-responsive element 4 is connected with an amplifier 5, which in turn is connected with known monostable multi-vibrators 6, 7, 8 and 9 having output terminals A, B, C and D respectively. The motor 1 is connected with a drive circuit including transistors 10, 11, 12, 13 and 14, resistors 15, 16, 17 and 18, a potentiometer 19, capacitors 20 and 21, a DC power source 22 and a power switch 23, through a voltage-current converter circuit 27 of high input impedance for supplying the motor 1 with a current proportional to the potential at the terminal 26 of the resistor 18. The output terminals A, B, C and D are of the monostable multivibrators 6, 7, 8 and 9 are connected with the bases of the transistors 14, 13, 12 and 11 respectively. Numerals 24 and 25 designate the junction between the capacitor 20 and collector of the transistor 13 and the junction between the capacitor 21 and the emitter thereof.

FIG. 3 illustrates the output waveforms of various components, i.e. amplifier 5, terminals A to D of monostable multivibrators 6 to 9, and collector 24 and emitter 25 of transistor 13. In FIG. 3, (a) represents the waveform of the electrical signal into which the light passed from the light source 3 through the slit in the disc 2 is converted by the photo-responsive element 4, (b) shows the waveform of the output at the terminal A of the monostable multivibrator 6 whose output is maintained at a high potential only for a time $t_1$ after the point of time when the output of the amplifier 5 exceeds a predetermined value, (c) is the waveform of the output at the terminal B of the monostable multivibrator 7 whose output is maintained at a high potential only for a time $t_2$ after the point of time when the output A of the monostable multivibrator 6 is varied from its high potential to a low potential, (d) is the waveform of the output at the terminal C of the monostable multivibrator 8 whose output is maintained at a low potential for a time $t_3$ after the point of time when the output A of the monostable multivibrator 6 is varied from its high potential to a low potential. And (e) the waveform of the output at the terminal D of the monostable multivibrator 9 whose output is maintained at a high potential only for a time $t_4$ after the point of time when the output C of the monostable multivibrator 8 is varied from its low potential to a high potential. FIG. 3 (f) shows the voltage waveform at the collector 24 of the transistor 13, and (g) the voltage waveform at the emitter 25 of the same transistor. In FIG. 3 (a), $t$ denotes the length of time required for 1 revolution of the motor 1, and in FIG. 3 (f), $V_1$, $V_2$ and $V_1'$, $V_2'$ respectively represent the potentials at the collector 24 of the transistor 13 immediately before and after the point of time when the output A is varied from its high to low potential. Similarly, $V_1''$ and $V_2''$ in FIG. 3 (g) represent the potentials at the emitter 25 of the transistor 13 immediately after the output A is varied from its high to low potential.

Each time $t_1$, $t_2$, $t_3$ or $t_4$ is sufficiently shorter than the time $t$, the time $t_3$ being longer than the time $t_2$. $t_1$, $t_2$, $t_3$ and $t_4$ may be set to suitable values in accordance with the velocity of movement of the magnetic tape T.

Figure 6:
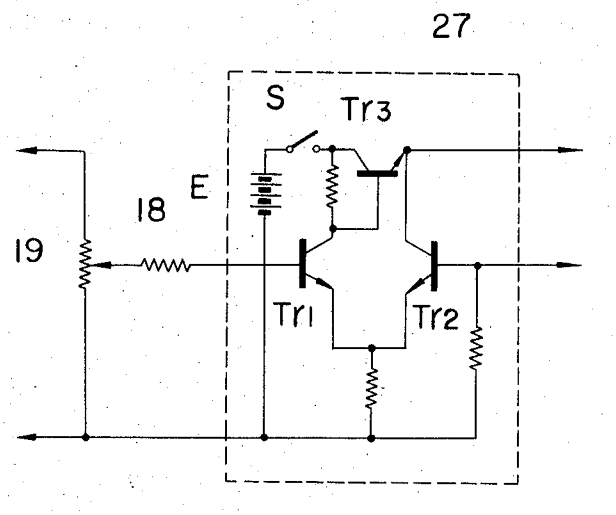
FIG. 6 diagrammatically shows an example of the voltage-current converter circuit applicable to the devices of FIGS. 2 and 4.

The voltage-current converter circuit 27 may comprise, for example, a differential amplifier circuit including transistors $Tr_1$ and $Tr_2$ as shown in FIG. 6. In this circuit, the terminal voltage of the capacitor 21 is applied as input to the transistor $Tr_1$ through the potentiometer 19, and the output current of the transistor $Tr_1$ varies the base current of control transistor $Tr_3$ connected in series with a drive power source E through a switch S, thus varying the collector current, i.e. the drive current supplied to the motor 1.

In operation, the switch 23 of FIG. 2, the switch S of FIG. 6 and a power switch (not shown) for a capstan driving motor (not shown) are all closed to drive the tape T at a constant velocity.

Figures 3A, 3B, 3C, 3D, 3E, 3F, 3G:
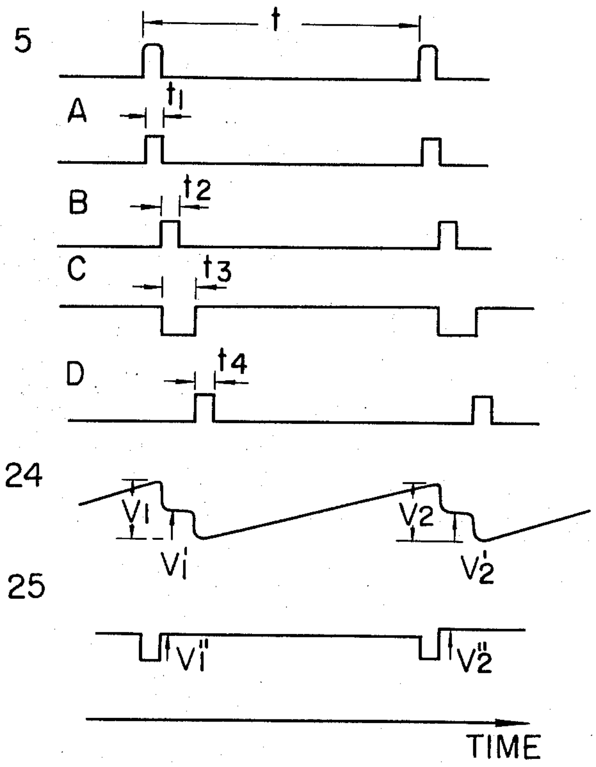
FIG. 3 illustrates waveforms at various parts of the device of FIG. 2.

When no light is detected by the photo-responsive element 4, the outputs A, B and D are maintained at low potentials while the output C is maintained at high potential, with the transistors 14, 13 and 11 being rendered non-conductive but transistor 12 conductive. The power from the power source 22 is made into a constant current by the transistor 10, and passed through the transistor 12 so as to be linearly stored in the capacitor 20 with lapse of time. This causes the potential at the collector 24 of the transistor 13 to rise linearly with time as shown in FIG. 3(f). When the disc 2 is rotated to cause its radial slit to be in accord with the line passing the light source 3 and detector element 4, the detector element 4 detects light to raise the output of the amplifier 5 to a high potential. At the same time, the output A of the monostable multivibrator 6 is also raised to a high potential and maintained so for the time $t_1$. As a result, the transistor 14 is rendered conductive only during that time $t_1$, whereby the capacitor 21 discharges its stored charge. When the output A assumes its low potential, the output B of the monostable multivibrator 7 assumes its high potential and the output C of the monostable multivibrator 8 assumes its low potential. The output B is maintained at its high potential for the time $t_2$, while the output C is maintained at its low potential for the time $t_3$. This means that the transistor 12 is rendered non-conductive only for the time $t_3$ while the transistor 13 is rendered conductive only for the time $t_2$.

It is now assumed that the collector 24 of the transistor 13 is at a potential $V_1$ immediately before the transistor 12 is rendered non-conductive. Since the capacitor 20 stores a charge proportional to the time $t$ required for one revolution of the motor, i.e. a charge inversely proportional to the number of revolutions of the motor, the voltage $V_1$ is at a potential inversely proportional to the number of revolutions of the motor. When the transistor 12 is turned off and the transistor 13 is turned on, the charge stored in the capacitor 20 is discharged into the empty capacitor 21, which thus stores a charge in proportion to the voltage $V_1$, and the junction 24 and junction 25 now assume potentials $V_1'$ and $V_1''$ which are inversely proportional to the number of revolutions of the motor 1. Since $t_2$ is less than $t_3$, the transistor 12 is permitted to turn on only after the transistor 13 is turned off.

When the transistor 12 has turned on, that is, when the output C of the monostable multivibrator 8 has assumed its high potential, the output D of the multivibrator 9 assumes its high potential and maintains it for the time $t_4$. Since the output D is maintained at the high potential only for the time $t_4$, the transistor 11 is rendered conductive to cause the capacitor 20 to discharge its stored charge through the transistor 11. After the transistor 11 has turned off, the capacitor 20 again starts to store a charge inversely proportional to the number of revolutions of the motor 1. The potential $V_1''$ at the emitter of the transistor 13 is maintained substantially at that level until the next detection of light takes place at the detector element 4. The resistors 18 and the potentiometer 19 are of such high resistance values as to permit the discharge of the capacitor 21 to be neglected. The voltage $V_1''$ is divided by the potentiometer 19, and the terminal 26 of the resistor 18 having a high resistance value maintains a potential proportional to $V_1''$ or inversely proportional to the number of revolutions of the motor 1. The voltage-current converter circuit 27 in turn supplies the motor 1 with a current proportional to the potential at the terminal 26. The potentiometer 19 can set the proportional constant K.

Figure 4:
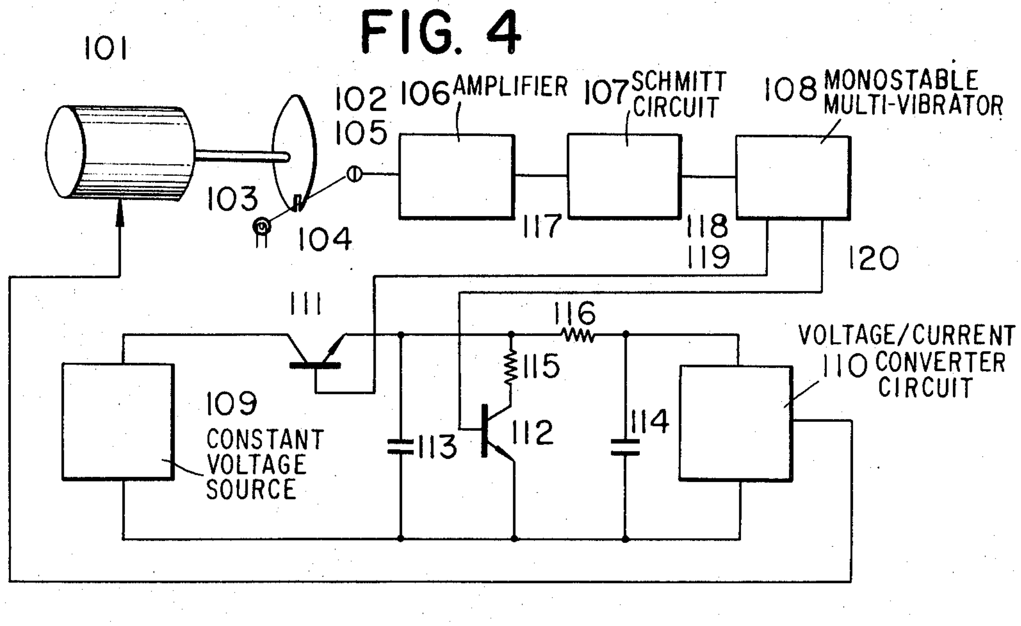
FIG. 4 is a block diagram illustrating a tension control device according to another embodiment of the present invention.

Referring to FIG. 4, there is shown a modified form of the present invention. In this embodiment, a reel driving motor 101 has a drive shaft having a light shielding disc 102 secured at one end thereof. The disc 102 has a radial slit 103 formed in the circumference thereof. A light source 104 and a photo-responsive element 105 are disposed in such a relationship that the photo-responsive element 105 detects light from the light source 104 and converts it into an electrical output when the slit 103 of the disc 102 is in alignment with the line passing the light source and photo-responsive element. Connected with the photo-responsive element 105 is an amplifier 106 having an output 117, to which is connected a Schmitt circuit 107 having an output 118 for providing a high potential only when the potential at the output 117 of the amplifier 106 exceeds a predetermined value. A monostable multivibrator 108 whose input includes a differentiation circuit is connected with the output 118 of the Schmitt circuit 107 so that the output 118 is differentiated to trigger the multivibrator 108 when the output 118 is varied to a high potential. The monostable multivibrator 108 has two output terminals 119 and 120, which are respectively maintained at a low potential and at a high potential only for a time $t_1$ when the monostable multivibrator 108 is triggered by the output 118, but thereafter these two output terminals 119 and 120 of the monostable multivibrator 108 are respectively maintained at a high potential and at a low potential for a time $t_2$ until the next trigger occurs. The time $t_1$ is shorter than the time $t_2$. In other words, for the time $t_1$ after the point of time when the photo-responsive element 105 has detected light, the output 119 is maintained at a low potential and the output 120 at a high potential (this is hereinafter referred to as "first condition"), and thereafter, for the time $t_2$ until the point of time when the photo-responsive element again detects light, the output 119 is maintained at a high potential and the output 120 at a low potential (this is hereinafter referred to as "second condition"). The output 119 of the monostable multivibrator 108 is connected with a constant voltage source 109, which in turn is connected with a voltage-current converter circuit 110 of high input impedance, as shown in FIG. 6, for supplying the motor 101 with a current proportional to the input voltage. Between the voltage source 109 and the voltage-current converter circuit 110 are inserted switching transistors 111 and 112, capacitors 113 and 114, and resistors 115 and 116, as shown. The resistor 115 is of a low resistance value, while the resistor 116 is of a high resistance value. The resistor 116 and the capacitor 114 together constitutes a smoothing circuit for smoothing the voltage applied to the capacitor 113 thereby to supply a DC voltage to the input of the voltage-current converter circuit 110. The output 120 of the multivibrator 108 is connected with the base of the switching transistor 112.

Figures 5A, 5B, 5C, 5D, 5E:
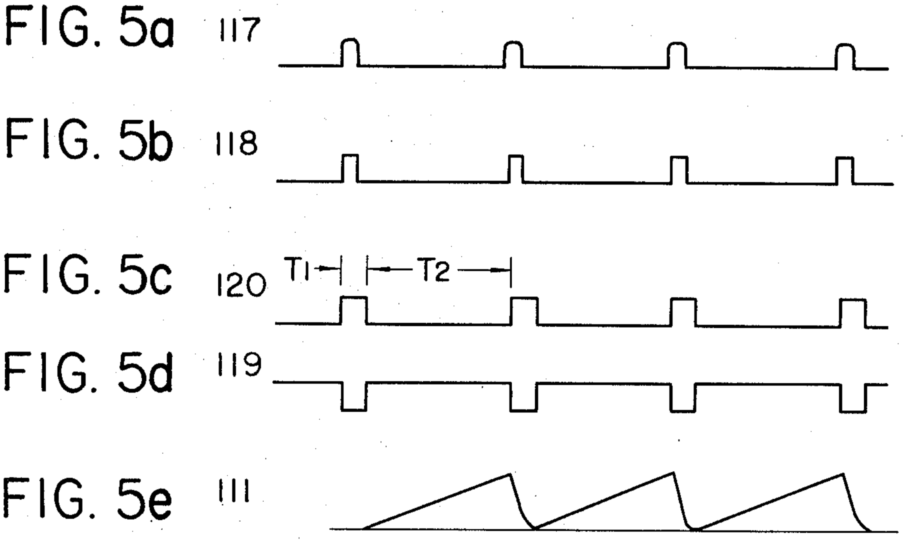
FIG. 5 illustrates waveforms at various parts of the device of FIG. 4.

FIG. 5 illustrates the voltage waveforms appearing at various parts of the embodiment shown in FIG. 4. In FIG. 5, (a), (b), (c) and (d) represent the voltage waveforms at outputs 117, 118, 120 and 119, respectively. FIG. 5(e) shows the voltage waveform at the emitter of the transistor 111.

Operation of the device shown in FIG. 4 will now be described with reference to FIG. 5. When the device is under the aforesaid first condition, the transistor 111 is turned off and the transistor 112 is turned on, so that the capacitor 113 discharges its stored charge through the resistor 115 and transistor 112 for the time $t_1$. Thereafter, when the second condition is reached, the transistor 111 is turned on and the transistor 112 is turned off. The second condition continues for the time $t_2$, and during that time the capacitor 113 stores a charge from the constant voltage source 109 through the transistor 111, which charge is in proportion to the time $t_2$, and thus the voltage across the capacitor 113 is also in proportion to the time $t_2$. This voltage assumes substantially the same waveform as shown in FIG. 5(e). Thereafter, when the second condition is shifted into the first condition, the capacitor 113 discharges its stored charge. The above-described operation is repeated as the motor 101 is rotated. However, if the time required for one revolution of the motor is longer, the time $t_2$ is also longer so that the charge stored in the capacitor 113 for that time is increased correspondingly. Conversely, if the time $t_2$ is shorter, the charge stored in the capacitor 113 for that time is decreased correspondingly. The resistor 116 and the capacitor 114 cooperates together to smooth the charge stored in the capacitor 113 so that a high DC voltage is supplied to the input of the voltage-current converter circuit when a greater deal of charge is stored in the capacitor 113, but that a low DC voltage is supplied to the same input when a smaller amount of charge is stored in the capacitor 113. In other words, a DC voltage proportional to the charge stored in the capacitor 113 is supplied to the input of the voltage-current converter circuit 110, which thus supplies the motor 101 with a current proportional to the input voltage. This means that the current supplied to the motor 101 is proportional to the time required for one revolution of that motor, or inversely proportional to the number of revolutions of that motor.

Thus, according to the above-described embodiments, in spite of the variation in the diameter of the roll of tape on the reel resulting from the tape supply, the reel motor is driven by a current proportional to the time required for one revolution of the reel driving motor or inversely proportional to the number of revolutions of that motor, whereby the moving tape is maintained at a constant tension and thus any variation in the reproducing level or frequency may be completely eliminated.

While both embodiments have been shown and described as applied to control the tension of a magnetic tape, the present invention is not limited in application to the control of such tape but equally applicable to the control of any member in the form of strip which is to be supplied at a constant velocity and a constant tension.

It will thus be appreciated that the present invention enables the rotational velocity of a supply reel having a strip wound thereon to be detected as an electrical signal, by which the current for driving the reel driving motor is varied to maintain the tension of the supplied strip at a constant value. Thus, the driving current can be varied in a very wide range and accordingly the tension of the supplied strip in a wide range of variation can also be maintained constant.

What is claimed is:

1. A tension control device for controlling the tension of a supplied strip at a constant level, comprising supply reel means having a strip wound thereon, a drive motor associated with said supply reel means for imposing a torque on the latter to maintain tension on the strip, constant drive means for driving said strip to move from said supply reel at a constant velocity, velocity detecting means for detecting the velocity of rotation of said supply reel means and converting the detected velocity of supply reel rotation into an electrical signal, and drive circuit means associated with said velocity detecting means for producing a current inversely proportional in magnitude to said electrical signal derived by said velocity detecting means, the output of said drive circuit means being electrically coupled to said motor so as to cause said motor to produce a torque inversely proportional to said velocity of rotation of said supply reel means, whereby said strip is supplied from said supply reel means at a constant tension.

2. A tension control device according to claim 1, wherein said drive circuit means includes a constant current circuit and is inserted in said charging circuit for said capacitor.

3. A tension control device according to claim 1, wherein said drive circuit means further includes a second capacitor and a second switching circuit, said second capacitor being connected in parallel with the first-named capacitor through the first-named switching circuit, said second switching circuit being inserted in the charging circuit for said second capacitor, said second capacitor being supplied with the charge of the first-named capacitor through said second switching circuit to thereby store a charge corresponding in amount to the charge of said first-named capacitor, said second capacitor being further connected with the input of said voltage-current converter circuit.

4. A tension control device according to claim 5, wherein said drive circuit means further includes a delay circuit connected with the output of said generator circuit, and a third switching circuit connected in parallel with the first-named capacitor, said third switching circuit being controlled for switching by the output of said delay circuit so as to cause the first-named capacitor to discharge later than a pulse provided by said pulse generator circuit.

5. A magnetic tape device for supplying a magnetic tape at a constant velocity and with a constant tension, comprising reel means for supplying and taking up a magnetic tape, a motor associated with at least said supply reel means to drive the latter, means disposed between said supply and take-up reel means to drive said magnetic tape to move at a constant velocity, means for detecting the velocity of rotation of said supply reel means and including a chopper disc mounted on the drive shaft of said motor, a photoresponsive element and a pulse generator circuit connected with said element, said detecting means detecting the velocity of rotation of said supply reel as pulses having different pulse intervals, a charging circuit including a switching circuit and a capacitor connected with said switching circuit for charging therethrough, said switching circuit being associated with the output of said pulse generator circuit, and a voltage-current converter circuit connected so as to receive the voltage of said capacitor in said charging circuit and convert it into a current corresponding to the level of said voltage, thereby to supply the current to said motor.

6. A magnetic tape device according to claim 5, wherein said charging circuit further includes a second switching circuit connected in parallel with said capacitor, and said detecting means further includes a delay circuit for delaying the output signal pulse of said pulse generator circuit by a predetermined time interval, said detecting means being associated with said second switching circuit so as to apply said delayed pulse as "ON-OFF" control signal for said second switching circuit, whereby a current corresponding to the velocity of rotation of said supply reel is supplied to said motor in accordance with the pulse generated by said pulse generator circuit, whereafter said capacitor discharges to prepare for a subsequent cycle of operation.

7. A tension control device according to claim 1, wherein said velocity detecting means comprises an element for generating intermittent electrical signals in response to the rotation of said reel means, and a pulse generator circuit connected with said element, thereby generating pulse signals at pulse intervals corresponding to the velocity of rotation of said means, and said drive circuit means includes a switching circuit, a capacitor and a voltage-current converter circuit, said switching circuit being inserted in the charging circuit of said capacitor and controlled for switching by the output of said pulse generator circuit so as to charge said capacitor at time intervals corresponding to the pulse intervals, said capacitor being connected with said voltage-current converter circuit so as to apply its terminal voltage to said converter circuit for supply said motor with a current corresponding to the charge potential of said capacitor, whereby the current supplied to said motor is proportional in magnitude to the velocity of rotation of said reel means so that said strip may be supplied from said reel means at a constant tension.

* * * * *